United States Patent [19]

Colanzi et al.

[11] Patent Number: 4,674,755
[45] Date of Patent: Jun. 23, 1987

[54] AXIAL AND RADIAL SEALING ASSEMBLY

[75] Inventors: Franco Colanzi; Angelo Vignotto, both of Turin; Mario Bessone, Pinerolo, all of Italy

[73] Assignee: Riv-Skfofficine Di Villar Perosa S.p.A., Turin, Italy

[21] Appl. No.: 766,440

[22] Filed: Aug. 19, 1985

[30] Foreign Application Priority Data

Sep. 18, 1984 [IT] Italy .................. 53825/84[U]

[51] Int. Cl.⁴ .................. F16C 33/76; F16J 15/16; F16J 15/32; F16J 15/54
[52] U.S. Cl. .................. 277/23; 277/37; 277/135; 277/166; 277/188 A; 277/189; 277/205; 277/208; 277/211; 277/237 A; 384/486
[58] Field of Search .......... 277/166, 189, 181–186, 277/211, 205, 135, 152, 37, 47, 48, 49, 84, 94, 95, 23, 237 A, 208, 188 A, DIG. 4; 384/486, 151, 143, 157

[56] References Cited

U.S. PATENT DOCUMENTS

| | | | |
|---|---|---|---|
| 2,488,465 | 11/1949 | Bourne, Jr. | 277/152 |
| 2,650,116 | 8/1953 | Cuny | 277/135 X |
| 2,833,570 | 5/1958 | LaPorte et al. | 277/237 A X |
| 2,834,616 | 5/1958 | Gebert et al. | 277/37 |
| 2,851,315 | 9/1958 | Zavoda | 384/486 |
| 2,858,176 | 10/1958 | Thompson | 384/486 X |
| 2,919,148 | 12/1959 | Smith | 277/23 X |
| 2,938,744 | 5/1960 | Fritch | 277/95 X |
| 3,108,815 | 10/1963 | Haynie et al. | 277/37 |
| 3,341,265 | 9/1967 | Paterson | 384/486 |
| 3,741,615 | 6/1973 | Otto | 277/189 X |
| 4,252,329 | 2/1981 | Messenser | 277/37 |
| 4,440,401 | 4/1984 | Olschewski | 277/50 |

FOREIGN PATENT DOCUMENTS

| | | | |
|---|---|---|---|
| 1111479 | 2/1956 | France | 384/486 |
| 2135405 | 8/1984 | United Kingdom | 277/135 |
| 229135 | 2/1969 | U.S.S.R. | 277/49 |

Primary Examiner—Allan N. Shoap
Attorney, Agent, or Firm—Gifford, Groh, VanOphem, Sheridan, Sprinkle & Dolgorukov

[57] ABSTRACT

An axial and radial sealing assembly comprising a protection ring which can be disposed annularly about a first body and frontally of a second body, and including a first part having a support function which carries a second part which has a sealing function. The main characteristic of this assembly is the fact that this second part has first radial surfaces forming an axial seal with the second body and second radial surfaces forming a radial seal with the first body.

14 Claims, 2 Drawing Figures

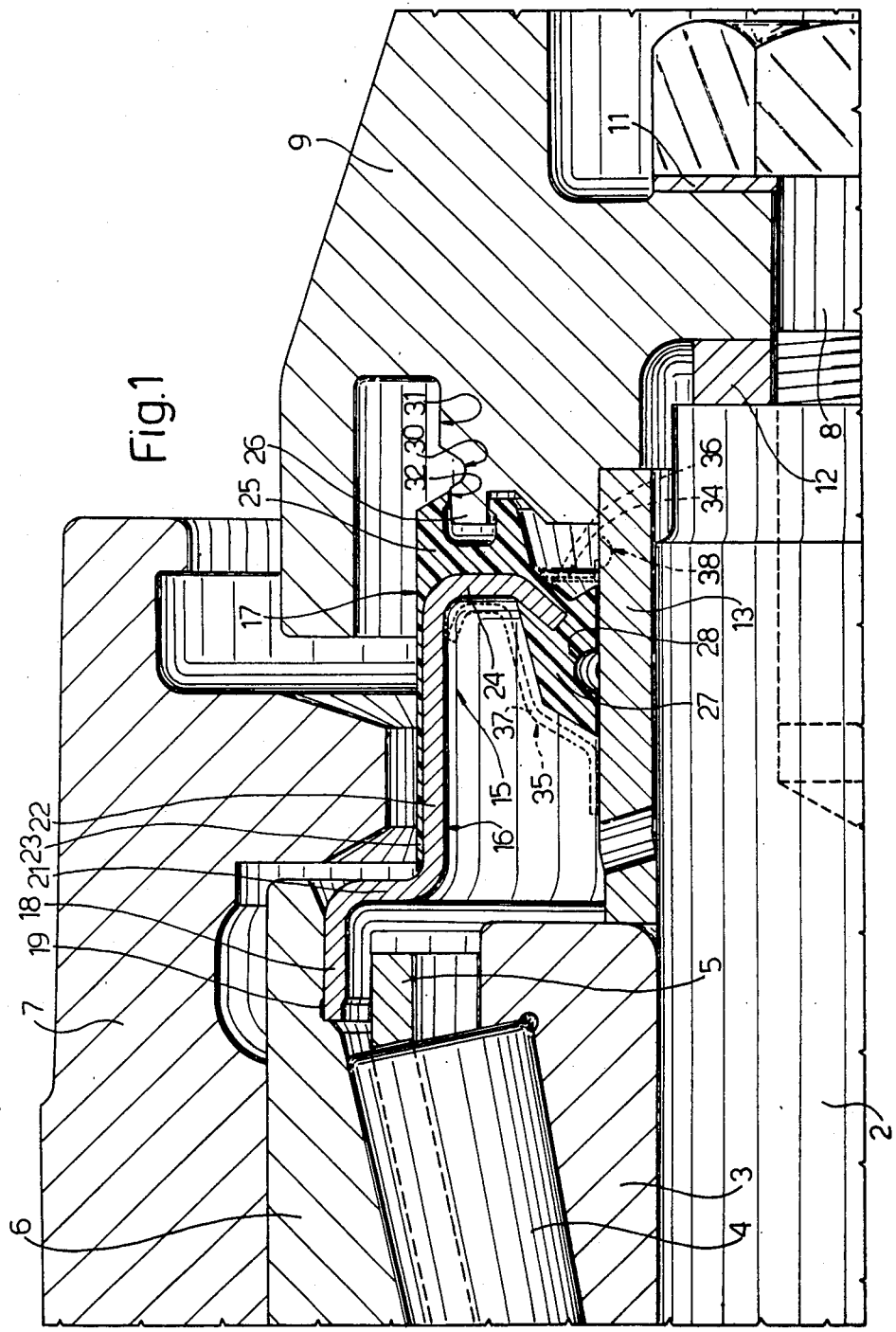

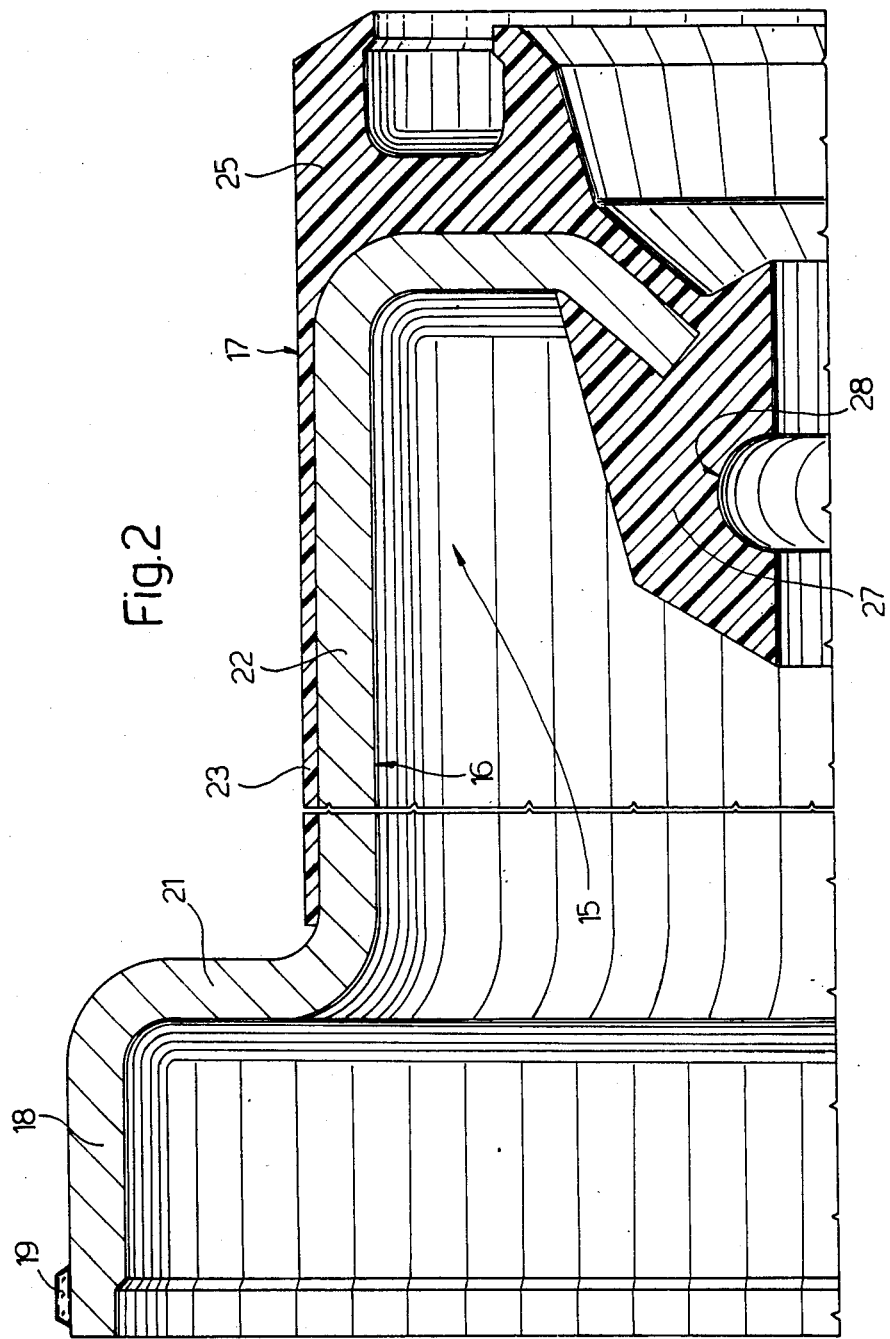

AXIAL AND RADIAL SEALING ASSEMBLY

BACKGROUND OF THE INVENTION

The present invention relates to a sealing assembly of the type comprising a protection ring which can be disposed annularly about a first body, generally a spacer body for a bearing, and frontally of a second body, generally a cover, and including a first part which has a support function, generally made of shaped sheet metal, which carries a second part, generally made of elastomeric material, which has a sealing function.

SUMMARY OF THE INVENTION

The object of the present invention is that of providing a sealing assembly of the said type, which however has improved sealing characteristics against external agents, for example water.

According to the present invention there is provided an axial and radial sealing assembly, including a protection ring which can be disposed annularly about a first body and frontally of a second body, and including a first part which performs a support function and which carries a second part which performs a sealing function, characterized by the fact that the said second part has first means forming an axial seal with the said second body and second means forming a radial seal with the said first body.

BRIEF DESCRIPTION OF THE DRAWINGS

For a better understanding of the present invention a particular embodiment is now described, by way of non limiting example, with reference to the attached drawings, in which:

FIG. 1 is a partial sectioned side view of a sealing assembly formed according to the present invention; and FIG. 2 is a partial sectioned side view, on an enlarged scale, of a protection ring of the sealing assembly of FIG. 1.

DETAILED DESCRIPTION OF THE PREFERRED EMBODIMENT

With reference to FIG. 1, the sealing assembly according to the present invention is fitted to a shaft 2 which, in a known way, carries an inner ring 3 of a taper roller bearing 4 the rollers of which are carried by a cage 5, and about which is disposed an outer ring 6 which carries, in turn, an outer body 7. On the end of the shaft 2 an outer cover 9 is fixed, by means of screws 8, with the interposition of a screw locking plate 11 between the heads of the screws 8 and the outer surface of the cover 9, and a seal 12 between the inner bottom of the cover 9 and the end of the shaft 2.

Between the cover 9 and the outer side of the ring 3 a spacer ring 13 is fittted around the shaft 2 in a conventional manner. Annularly around the spacer ring 13 and frontally of the cover 9 there is disposed a protection ring 15 which includes a first part 16 having a support function and made of conveniently shaped sheet metal, on which there is fixed a second part 17, conveniently made of elastomeric material and having a sealing function with characteristics which will be described in more detail below. This first part 16 has a first annular portion 18 of greater diameter nearer the bearing 4, which as is better seen in FIG. 2 has external projections 19 which are housed in respective inner cavities of the outer ring 6. From the first annular portion 18 a second portion 21 then extends perpendicularly towards the shaft 2, and from which then extends a third portion 22, which is also annular, on which is fixed a first annular end portion 23 of the part 17. From the outer end of the annular portion 22 a terminal portion 24 extends radially towards the spacer ring 13, and to this terminal portion 24 is fixed a substantial portion of the part 17 which, in particular, includes an annular portion 25 extending outwardly and having a C-shape axial section or U-shape section, which is disposed around and facing, that is to say without contact, a perimetral edge 26 of the cover 9 and further extends radially inwardly towards the spacer ring 13 with a second annular portion 27 in which, facing this spacer ring 13, there is formed an annular groove 28. Both in the annular groove 28 and in the annular cavity defined by the C-shape or U-shape portion 25, there is disposed lubricating grease. As is visible in FIG. 1, on the outer surface of the perimetral edge 26 spaced axially outwardly of the end of the portion 25, there is formed an annular groove 30 having an outer edge 31 which has a greater radius than that of the inner edge 32.

As is also visible in FIG. 1, on the spacer ring 13 from a single side or from two sides of the portion 27, there can be disposed respective screens 34 and 35, indicated in broken outline, having a respective radial portion 36 and 37 which is respectively directed or shaped such as to cover the inner form of the protection ring 15. In correspondence with the screen 34 the spacer ring 13 can be formed with an annular groove 38, also indicated in broken outline.

The advantages obtained with the sealing assembly of the present invention are apparent from what has been described, in particular, an efficient seal against external agents such as water is obtained, both axially by means of the portion 25 which faces and surrounds the perimetral edge 26 of the cover 9, and radially with the portion 27, which faces the surface of the spacer ring 13. The presence of the grease in the annular groove 28 and in the annular cavity of the portion 25 improves the efficiency of this seal.

This seal, moreover, is improved both by the formation of the annular groove 30 on the cover 9 with the outer edge 31 having a greater diameter than the diameter of the inner edge 32, and by the possible presence, simultaneously or otherwise, of the screens 34 and 35 which respectively create, in combination with the groove 38, a centrifugal effect on the external polluting elements, and a grease seal present in the groove 28.

Finally, it is clear that the described and illustrated embodiment of the sealing assembly and associated protection ring formed according to the present invention can be modified and varied in form and arrangement without departing from the scope of the invention itself.

We claim:

1. A seal assembly for use in conjunction with a housing, a shaft carried on said housing and being rotatable about a longitudinal axis, and a bearing disposed between said housing and said shaft, said assembly comprising:
   a bearing cover carried on said shaft generally exterior of said housing;
   a spacer disposed along said shaft between said bearing and said bearing cover; and
   a ring seal disposed about such spacer between said shaft and said housing and including radial facing means for forming a first seal with radial facing surface means of said cover and a second seal with said spacer.

2. The invention according to claim 1, wherein said second seal includes a radially outwardly depending annular groove facing said spacer.

3. The invention according to claim 1, wherein said ring seal comprises a metal core and an elastomeric material disposed about at least a part of said core.

4. A seal assembly for use in conjunction with a housing and a shaft carried on said housing and being rotatable about a longitudinal axis, said assembly comprising:
   a rotatable body carried on said shaft generally exterior of said housing;
   a spacer disposed about said shaft between said shaft and said housing;
   a ring seal disposed about said spacer between said spacer and said housing and including radial facing surface means for forming a first seal with radially facing surface means of said body and a second seal with said spacer; and
   a screen disposed on and depending radially outwardly from said spacer adjacent to but spaced from said second seal.

5. The invention according to claim 4, wherein said screen is disposed between said second seal and said body.

6. The invention according to claim 5, wherein said spacer includes a radially inwardly depending circumferential groove adjacent said screen.

7. The invention according to claim 4, wherein said second seal is disposed between said screen and said body.

8. The invention according to claim 4, wherein said second seal includes a radially outwardly depending annular groove facing said spacer.

9. The invention according to claim 4, wherein said ring seal comprises a metal core and an elastomeric material disposed about at least a part of said core.

10. A seal assembly for use in conjunction with a housing and a shaft carried on said housing and being rotatable about a longitudinal axis, said assembly comprising:
    a rotatable body carried on said shaft generally exteriorly of said housing;
    a spacer disposed about said shaft between said shaft and said housing; and
    a ring seal disposed about said spacer between said spacer and said housing and including means for forming a first seal with said body and a second seal with said spacer;
    wherein said body includes a cylindrical flange coaxial with said shaft axis, extending towards said first seal means and having a radially inward surface and a radially outward surface; and
    wherein said first seal means comprises an annular portion extending towards said body, said annular portion being U-shaped in section and being disposed about said flange, said annular portion having opposing radially facing end surfaces each abutting, respectively, said inward and outward surfaces of said body flange.

11. The invention according to claim 10, wherein said body comprises a radially inwardly depending annular groove adjacent said flange.

12. The invention according to claim 10, wherein said second seal means includes a radially outwardly depending annular groove facing said spacer.

13. The invention according to claim 10, wherein said first seal means includes a segment of said annular portion spaced from said flange.

14. The invention according to claim 10, wherein said ring seal comprises a metal core and an elastomeric material disposed about at least part of said core.

* * * * *